(12) United States Patent
Florczak

(10) Patent No.: US 11,483,678 B2
(45) Date of Patent: Oct. 25, 2022

(54) SYSTEM, METHOD AND COMPUTER PROGRAM FOR POSITIONING ANIMAL TAGS

(71) Applicant: DELAVAL HOLDING AB, Tumba (SE)

(72) Inventor: Keld Florczak, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/057,372

(22) PCT Filed: May 20, 2019

(86) PCT No.: PCT/SE2019/050459
§ 371 (c)(1),
(2) Date: Nov. 20, 2020

(87) PCT Pub. No.: WO2019/226103
PCT Pub. Date: Nov. 28, 2019

(65) Prior Publication Data
US 2021/0195375 A1 Jun. 24, 2021

(30) Foreign Application Priority Data
May 23, 2018 (SE) .................................. 1850608-9

(51) Int. Cl.
*H04W 4/029* (2018.01)
*G01S 5/02* (2010.01)
(Continued)

(52) U.S. Cl.
CPC ......... *H04W 4/029* (2018.02); *G01S 5/02216* (2020.05); *G01S 5/04* (2013.01); *H04W 56/001* (2013.01)

(58) Field of Classification Search
CPC ................ H04W 4/029; H04W 56/001; G01S 5/02216; G01S 5/04
See application file for complete search history.

(56) References Cited

U.S. PATENT DOCUMENTS

2003/0234741 A1  12/2003  Rogers et al.
2007/0021122 A1   1/2007  Lane et al.
(Continued)

FOREIGN PATENT DOCUMENTS

| GB | 2460032     | 11/2009 |
| RU | 2 640 395 C1 | 1/2018  |

(Continued)

OTHER PUBLICATIONS

Search Report for SE Patent Application No. 1850608-9 dated Jan. 25, 2019, 2 pages.
(Continued)

*Primary Examiner* — Umair Ahsan
(74) *Attorney, Agent, or Firm* — Nixon & Vanderhye

(57) ABSTRACT

A system and method applicable for determining the positions of radio tags based on triangulation and respective radio tag signals transmitted from each radio tag, where each of a set of base stations is configured to transmit a radio base signal including an identifier that uniquely identifies the base station, and other base stations of the set of base stations receive the radio base signal and forward received base station messages to a central control unit which determines a position for any added base station using triangulation and known positions for base stations already included in the system, in order to facilitate expanding the number of base stations in the system.

2 Claims, 3 Drawing Sheets

(51) Int. Cl.
    *G01S 5/04*     (2006.01)
    *H04W 56/00*    (2009.01)

(56) References Cited

U.S. PATENT DOCUMENTS

| | | | |
|---|---|---|---|
| 2009/0070797 A1* | 3/2009 | Ramaswamy | H04N 21/4436 725/10 |
| 2009/0295639 A1* | 12/2009 | Zhao | G01S 11/16 342/387 |
| 2011/0028166 A1 | 2/2011 | Ketchum et al. | |
| 2015/0094081 A1* | 4/2015 | Gupta | H04W 64/003 455/456.1 |
| 2017/0026787 A1 | 1/2017 | Chow et al. | |

FOREIGN PATENT DOCUMENTS

| | | |
|---|---|---|
| WO | 2005/081012 | 9/2005 |
| WO | 2006/022548 | 3/2006 |
| WO | 2014/067896 | 5/2014 |
| WO | 2014/067897 | 5/2014 |
| WO | 2017/131575 | 8/2017 |

OTHER PUBLICATIONS

International Search Report for PCT/SE2019/050459 dated Sep. 3, 2019, 4 pages.
Written Opinion of the ISA for PCT/SE2019/050459 dated Sep. 3, 2019, 12 pages.
Office Action issued in Russian Patent Application No. 2020142241/07(078458) dated Feb. 3, 2022.

* cited by examiner

SYSTEM, METHOD AND COMPUTER PROGRAM FOR POSITIONING ANIMAL TAGS

This application is the U.S. national phase of International Application No. PCT/SE2019/050459 filed May 20, 2019 which designated the U.S. and claims priority to SE Patent Application No. 1850608-9 filed May 23, 2018, the entire contents of each of which are hereby incorporated by reference.

TECHNICAL FIELD

The present invention relates generally to keeping track of the individuals in a group of animals. More particularly, the invention relates to a system and a method of positioning animal tags. The invention also relates to a computer program and a non-volatile data carrier.

BACKGROUND

For animal-health reasons and to maintain high quality and efficiency in animal-based food production it is important that the physical status of livestock animals can be monitored in a convenient and reliable manner. This, in turn, requires that the movements of the animals can be tracked continuously.

WO 2014/067896 and WO 2014/067897 describe systems for measuring real time positions of a plurality of animals carrying radio transmitter tags. Inputs from a plurality of sensors are received, and the actual positions of the animals are calculated based on measurements of delay in radio communication. Thus, for example the behavior of each animal can be analyzed. Calibration is performed via communication between the sensors and a plurality of fixed reference tags. Thereby, the animals can be positioned with good accuracy.

However, setting up the sensor system requires considerable efforts to ensure that the position of each sensor is known with sufficient precision.

SUMMARY

The object of the present invention is to offer a resourceful positioning system, which is easy to install and straightforward to expand if for example a larger area is to be covered and/or a better positioning quality is desired.

According to one aspect of the invention, the object is achieved by a system for positioning animal tags containing a central control unit and a set of base stations. Each base station is configured to receive a global time reference, for example a highly accurate clock signal. The base stations are also configured to receive radio tag signals transmitted from animal tags. Each of these radio tag signals contains an identifier uniquely identifying the respective animal tag. Each base station is further configured to forward a respective tag message describing each of any received radio tag signals to the central control unit. The central control unit, in turn, is configured to receive the tag messages, and based thereon determine a respective position for each animal tag from which a radio tag signal has been received by at least three base stations. Moreover, each base station is configured to transmit a radio base signal comprising an identifier uniquely identifying the base station; receive radio base signals from the other base stations; and forward a base station message describing any received radio base signal to the central control unit. Analogously, the central control unit is further configured to receive at least three base station messages describing a first radio base signal from a first base station, typically one that has newly been added to the system. Based on the received base station messages, the central control unit is configured to determine a position for the first base station by using triangulation and a respective known position for each of said at least three base stations.

This system is advantageous because it enables addition of new base stations in a very straightforward manner According to one embodiment of this aspect of the invention, said base stations are configured to transmit the radio base signals repeatedly, and the central control unit is configured to determine a respective updated position for a particular base station in response to receiving a new radio base signal from the particular base station, which new radio base signal has been received by at least three other base stations. Thereby, the base station positions can be refreshed, and the error propagation can be held low.

According to another embodiment of this aspect of the invention, the central control unit is specifically configured to determine the position of a first animal tag based on triangulation using the tag messages describing the radio tag signal received by at least three base stations and respective propagation delays of the radio tag signal calculated based on the global time reference. Hence, reliable tag positioning can be effected.

According to still another embodiment of this aspect of the invention, the set of base stations includes a subset of anchor base stations and at least one intermediate base station. The anchor base stations are arranged in a frame, e.g. with a rectangular outline, around an area in which positions for animal tags are to be determined. The anchor base stations are presumed to be located in a common plane. The at least one intermediate base station is arranged between two base stations in the set of anchor base stations.

Preferably, the anchor base stations have a known elevation relative to a reference level, such as the ground; and at least one of the intermediate base stations is located outside the common plane, for instance higher. The central control unit is further configured to receive at least one elevation indicator, e.g. a binary symbol, which for each intermediate base station being located outside the common plane reflects whether the base station is located above or below the common plane. For each intermediate base station, the central control unit is configured to determine a respective position in three dimensions based on at least three base station messages describing a radio base signal from the at least one intermediate base station and the known elevation of the anchor base stations. This means that also base stations located on ridge beams can be conveniently positioned with high accuracy.

According to another embodiment of this aspect of the invention, it is presumed that, in a projection onto the common plane, the intermediate base station is located on a straight line between first and second anchor base stations. The central control unit is here configured to: obtain an overall distance between the first and second anchor base stations; calculate a first sub distance between the first anchor base station and the intermediate base station; calculate a second sub distance between the second anchor base station and the intermediate base station; and determine that the intermediate base station is located outside the common plane if a sum of the first and second sub distances is larger than the overall distance. Consequently, any added intermediate base stations can be positioned in a very straightforward manner.

According to another aspect of the invention, the object is achieved by a method of positioning animal tags via a set of base stations and a central control unit. The method involves receiving, in each base station in the set of base stations, a global time reference; and receiving, in at least three base stations in said set, a radio tag signal transmitted from an animal tag. The radio tag signal contains an identifier uniquely identifying the animal tag. The method further involves: forwarding, from each of the at least three base stations, a respective tag message describing the received radio tag signal to the central control unit; receiving in the central control unit the tag messages; and based thereon determining a position for the animal tag. Additionally, the method involves: transmitting, from each base station in said set, a respective radio base signal containing an identifier uniquely identifying the base station; checking if a radio base signal has been received from any of the other base stations in said set; and in response to a received radio base signal, forwarding a base station message describing any received radio base signal from the base station to the central control unit; and in response to receiving in the central control unit at least three base station messages describing a first radio base signal from a first base station; determining a position for the first base station using triangulation and a respective known position for the base stations from which the at least three base station messages were received. The advantages of this method, as well as the preferred embodiments thereof, are apparent from the discussion above with reference to the control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
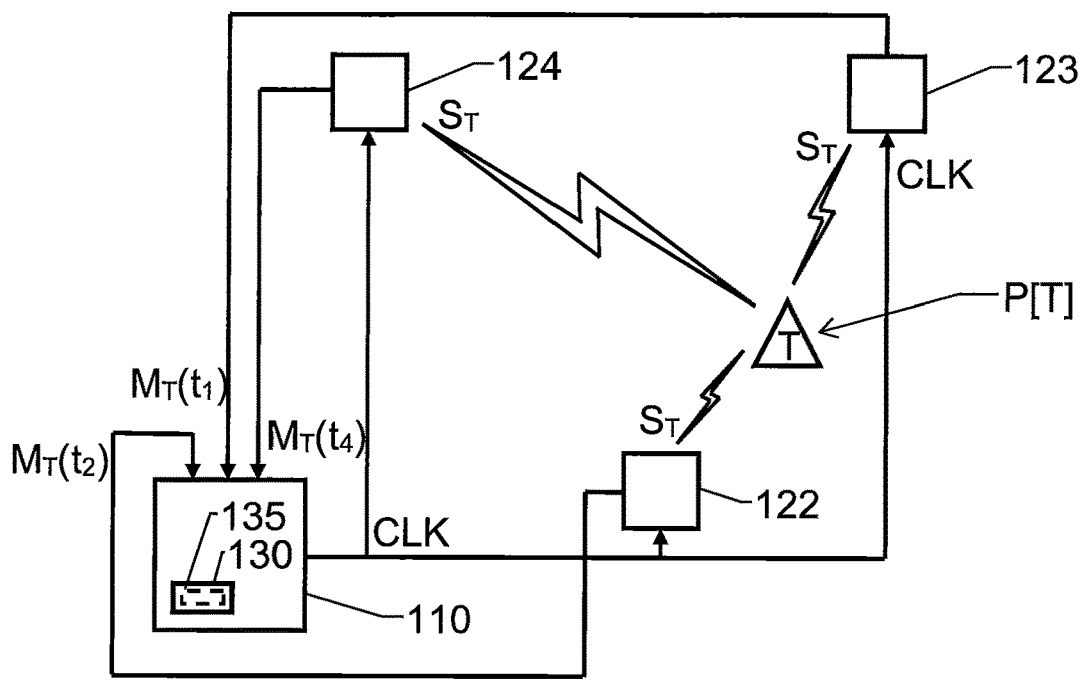
FIG. 1 Illustrates schematically how an animal tag is positioned according to the invention.

In FIG. 1, we see a schematic illustration of a system for positioning animal tags T according to one embodiment of the invention.

The system includes a central control unit 110 and a set of base stations 122, 123 and 124 respectively. Each base station in the set of base stations is configured to receive a global time reference CLK, for example in the form of a clock signal from the central control unit 110. Thereby, all base stations share a common time basis that enables determining propagation delays in radio signals that have been received by two or more of the base stations.

Each base station in the set of base stations 122, 123 and 124 is also configured to receive a respective radio tag signal $S_T$ that has been transmitted from at least one animal tag T. Each of these radio tag signals $S_T$ contains an identifier uniquely identifying the respective animal tag T. Thereby, the radio tag signals $S_T$ can be distinguished from one another upon receipt in the base stations.

Each base station in the set of base stations 122, 123 and 124 is also configured to forward a respective tag message $M_T(t_2)$, $M_T(t_3)$ and $M_T(t_4)$ to the central control unit 110. The tag messages $M_T(t_2)$, $M_T(t_3)$ and $M_T(t_4)$ describe each of any received radio tag signals $S_T$. In the example illustrated in FIG. 1, the animal tag T is located a relatively short distance from a base station 122, a relatively long distance from a base station 124 and at an intermediate distance from a base station 123. Consequently, the radio tag signals $S_T$ will reach the base station 122 at a first point in time $t_1$, the base station 123 at a second point in time $t_2$, and the base station 124 at a third point in time $t_3$, where the first, second and third points in time occur in the temporal order $t_1$, $t_2$ and $t_3$. The tag messages $M_T(t_2)$, $M_T(t_3)$ and $M_T(t_4)$ reflect the first, second and third points in time $t_1$, $t_2$ and $t_3$ respectively.

The central control unit 110 is configured to receive the tag messages $M_T(t_2)$, $M_T(t_3)$ and $M_T(t_4)$, and based thereon determine a position P[T] for the animal tag T. This determination is made by analyzing the radio tag signal $S_T$ having been received by at least three base stations, here 122, 123 and 124.

Preferably, the central control unit 110 is configured to determine the position of the animal tag T based on triangulation by using the tag messages $M_T(t_2)$, $M_T(t_3)$ and $M_T(t_4)$. Namely, each tag message $M_T(t_2)$, $M_T(t_3)$ and $M_T(t_4)$ contains an indication of the propagation delay radio tag signal $S_T$ to the base station in question, and thus a distance measure between the animal tag T and this base station. Assuming that the respective position of each of said base stations 122, 123 and 124 is known, it is straightforward to determine the position P[T] for the animal tag T.

Figure 2:
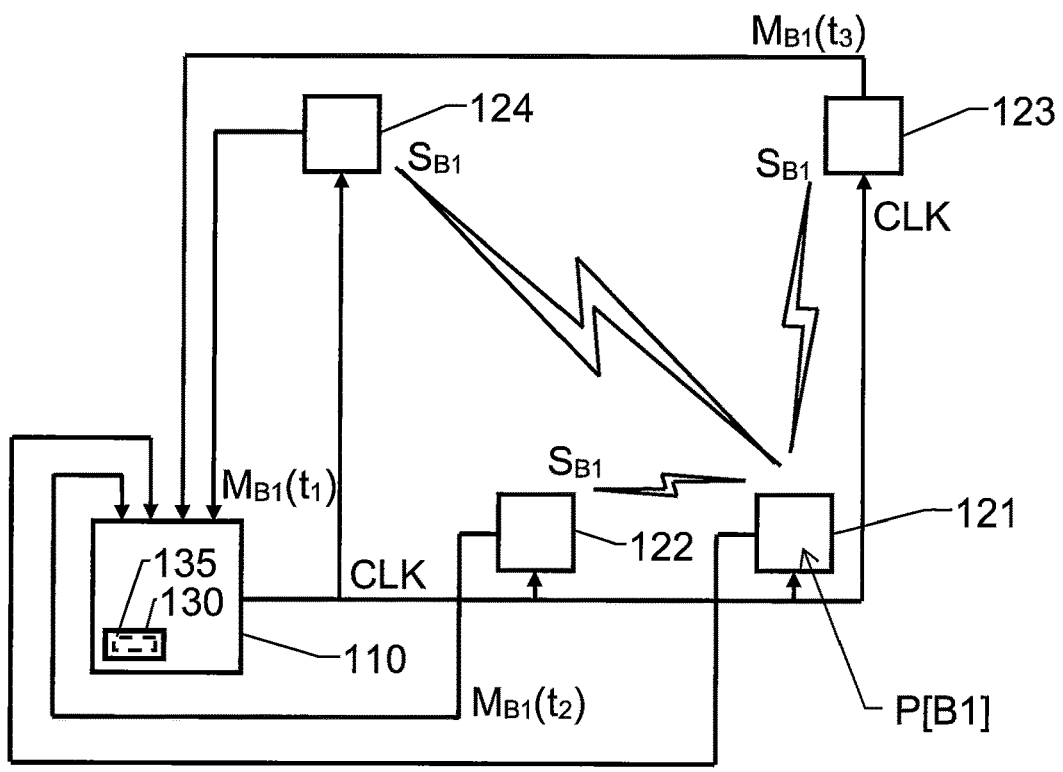
FIG. 2 Illustrates schematically how a base station is positioned according to the invention.

Referring now to FIG. 2, we will explain how a base station is positioned according to the invention. Here, a base station 121 is also included in addition to the base stations 122, 123 and 124 of FIG. 1. Analogous to above, we assume that the respective positions of the base stations 122, 123 and 124 are known. However, the base station 121 is newly added resource whose position is to be determined. To this aim, each base station 121, 122, 123 and 124 is configured to transmit a respective radio base signal containing an identifier uniquely identifying the base station. FIG. 2 shows one such radio base signal $S_{B1}$ transmitted from the base station 121, and thus containing an identifier uniquely identifying the base station 121.

Each base station is configured to receive radio base signals from other base stations in the system, i.e. here the base station 122 is configured to receive radio base signals from the base stations 121, 123 and 124; the base station 123 is configured to receive radio base signals from the base stations 121, 122 and 124; the base station 124 is configured to receive radio base signals from the base stations 121, 122 and 123; the base station 121 is configured to receive radio base signals from the base stations 122, 123 and 124. Moreover, each base station is configured to forward a base station message describing any received radio base signal to the central control unit 110. In the example shown in FIG. 2, the base station messages $M_{B1}(t_2)$, $M_{B1}(t_3)$ and $M_{B1}(t_4)$ describing the radio base signal $S_{B1}$ are forwarded from the base stations 122, 123 and 124 to the central control unit 110.

The central control unit 110, in turn, is configured to receive base station messages describing radio base signals, and based thereon determine positions for the base stations concerned. A condition for this is that base station messages from a given base station, say 121, have been received by at least three other base stations. In FIG. 2, the central control unit 110 receives the base station messages $M_{B1}(t_1)$, $M_{B1}(t_2)$ and $M_{B1}(t_3)$ describing the radio base signal $S_{B1}$ from the base station 121. Based thereon, the central control unit 110 determines a position P[B1] for the base station 121 using triangulation and a respective known position for each of said at least three base stations 122, 123 and 124 analogous to what is described above referring to determining the position P[T] for the animal tag T.

According to one embodiment of the invention, the base stations 121, 122, 123 and 124 are configured to transmit the radio base signals repeatedly, i.e. not only when a new base station is added to the system.

The central control unit 110 is further configured to determine a respective updated position P[B1] for a particular base station, e.g. 121, in response to receiving a new radio base signal $SB_1$ from that base station 121. Analogous to the above, a condition for this is that the new radio base signal $SB_1$ has been received by at least three other base stations in the system, such as 122, 123 and 124.

Figure 3:
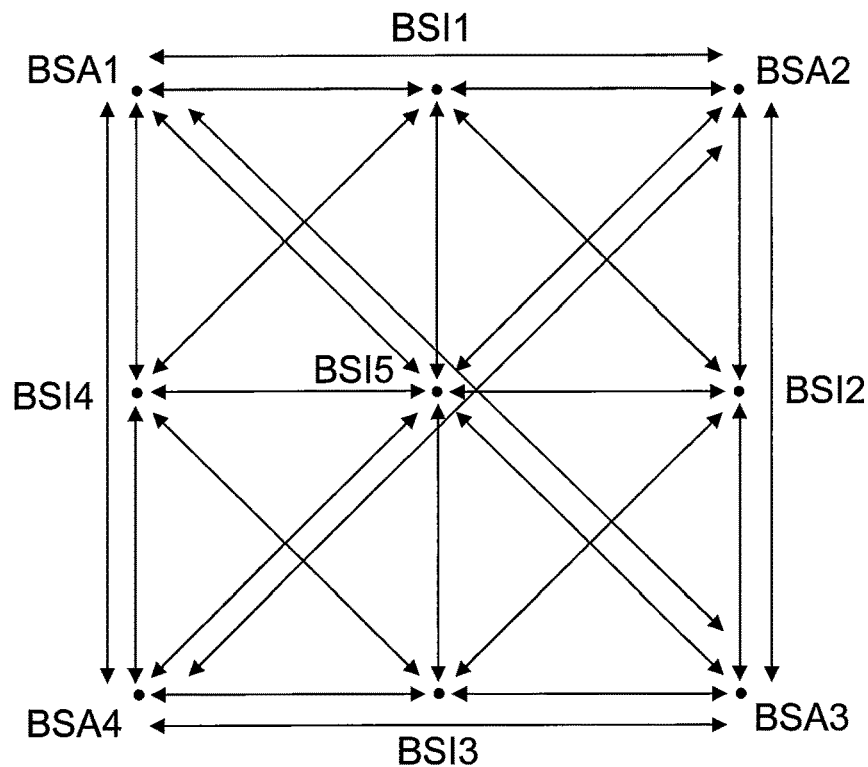
FIG. 3 shows an example of how anchor base stations and intermediate base stations can be arranged according to one embodiment of the invention.

According to embodiments of the invention, the system contains base stations of at least two different categories, namely anchor base stations and at least one intermediate base station. FIG. 3 shows an example configuration, where a subset of anchor base stations BSA1, BSA2 and BSA3, BSA4 are arranged in a frame around an area in which positions for animal tags T are to be determined. The subset of anchor base stations BSA1, BSA2, BSA3 and BSA4 are located in a common plane. Typically, this means that they all have the same elevation relative to a reference plane, e.g. the ground.

In FIG. 3, the at least one intermediate base station is represented by BSI1, BSI2, BSI3, BSI4 and BSI5. An intermediate base station is defined as a base station being arranged between two base stations in the set of anchor base stations, i.e. here BSA1, BSA2, BSA3 and BSA4. An intermediate base station may either be located in the common plane of the anchor base stations, or outside this plane. For instance, BSI1 and BSI4 may be located in the common plane while BSI2, BSI3 and BSI5 are located outside the common plane as will be discussed below.

Figure 4:
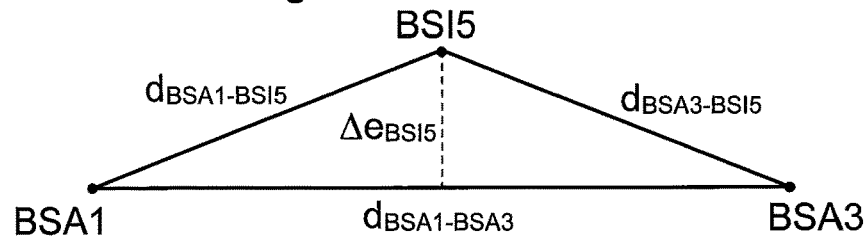
FIGS. 4-6 exemplify different elevation relationships between the anchor base stations and the intermediate base stations according to embodiments of the invention.

FIG. 4 shows the anchor base stations BSA1 and BSA3 and the intermediate base station BSI5 seen from a view perpendicular to the view represented in FIG. 3. The anchor base stations BSA1 and BSA3 have a known, and here equal, elevation relative to the reference level. Namely, we presume that the elevation level of the common plane is known.

The intermediate base station BSI3, however, is located outside the common plane. In FIG. 4, this is indicated by a deviation $\Delta e_{BSI5}$ from the common plane. In order to determine a position in three dimensions for the intermediate base station BSI3, i.e. effectively calculating the deviation $\Delta e_{BSI5}$, the central control unit 110 is configured to receive an elevation indicator for the intermediate base station BSI1. The elevation indicator is merely a symbol reflecting whether the intermediate base station is located above or below the common plane. For example, a binary "1" may symbolize above and a binary "0" may symbolize below.

The central control unit 110 is further configured to determine a respective distance $d_{BSA1-BSI5}$ and $d_{BSA3-BSI5}$ between the intermediate base station BSI1 and each of said anchor base stations BSA1 and BSA3. The distances $d_{BSA1-BSI5}$ and $d_{BSA3-BSI5}$ are determined as described above by receiving base station messages from the intermediate base station BSI1 in base stations whose locations are already known with respect to position as well as elevation.

According to one embodiment of the invention, it is presumed that, in a projection onto the common plane, the intermediate base station BSI5 is located on a straight line between the anchor base stations BSA1 and BSA3 respectively.

The central control unit 110 is configured to obtain an overall distance $d_{BSA1-BSA3}$ between the anchor base stations BSA1 and BSA3, either from a database or by calculation as described above. The central control unit 110 is further configured to calculate a first sub distance $d_{BSA1-BSI5}$ between the first anchor base station BSA3 and the intermediate base station BSI5; and calculate a second sub distance $d_{BSA3-BSI5}$ between the second anchor base BSA3 station and the intermediate base station BSI5. The first and second sub distances $d_{BSA1-BSI5}$ and $d_{BSA3-BSI5}$ are likewise calculated by receiving base station messages from the intermediate base station BSI1 in base stations whose locations are already known.

Then, by applying Pythagoras Theorem and by using the elevation indicator, central control unit 110 is configured to determine the specific elevation the intermediate base station BSI5, i.e. calculating the deviation $\Delta e_{BSI5}$ and applying an adequate sign relative to the common plane.

The central control unit 110 is preferably configured determine whether or not the intermediate base station BSI5 is located in the common plane as follows. If a sum of the first and second sub distances $d_{BSA1-BSI5}$ and $d_{BSA3-BSI5}$ is larger than the overall distance $d_{BSA1-BSA3}$ between the anchor nodes BSA1 and BSA3, then the intermediate base station BSI5 is not located in the common plane.

Figure 5:
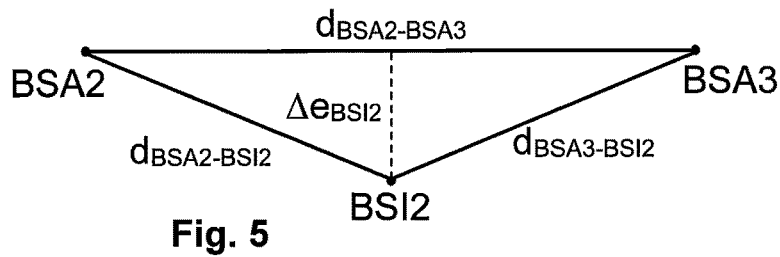

FIG. 5 shows another example illustrating that the intermediate base station BSI2 is located a deviation $\Delta e_{BSI2}$ below the common plane in which the anchor nodes BSA2 and BSA3 are located. The anchor nodes BSA2 and BSA3 are separated from one another by an overall distance $d_{BSA2-BSA3}$, a first sub distance between the anchor node BSA2 and the intermediate node BSI2 is $d_{BSA2-BSI2}$ and a second sub distance between the anchor node BSA3 and the intermediate node BSI2 is $d_{BSA3-BSI2}$.

Figure 6:
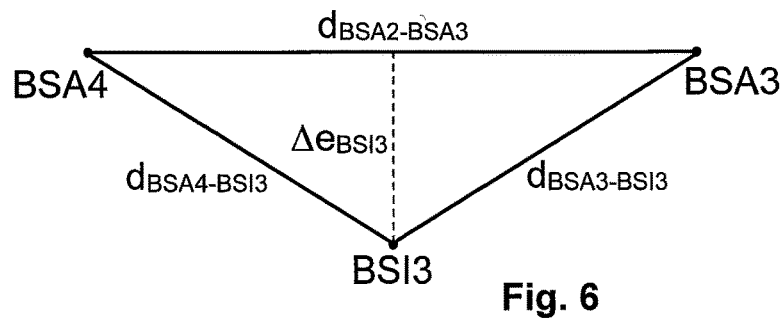

FIG. 6 shows yet another example of an intermediate node BSI3 being located below the common plane, namely the one including the anchor nodes BSA3 and BSA4 respectively. Here, the anchor nodes BSA3 and BSA4 are separated from one another by an overall distance $d_{BSA3-BSA4}$, a first sub distance between the anchor node BSA3 and the intermediate node BSI3 is $d_{BSA3-BSI3}$ and a second sub distances between the anchor node BSA4 and the intermediate node BSI3 is $d_{BSA4-BSI3}$.

It is generally advantageous if the processing unit 120 is configured to effect the above-mentioned procedure in an automatic manner by executing a computer program 135. Therefore, the processing unit 120 may include a memory unit, i.e. non-volatile data carrier 130, storing the computer program 135, which, in turn, contains software for making processing circuitry in the form of at least one processor in the processing unit 120 execute the above-described actions when the computer program 135 is run on the at least one processor.

Figure 7:
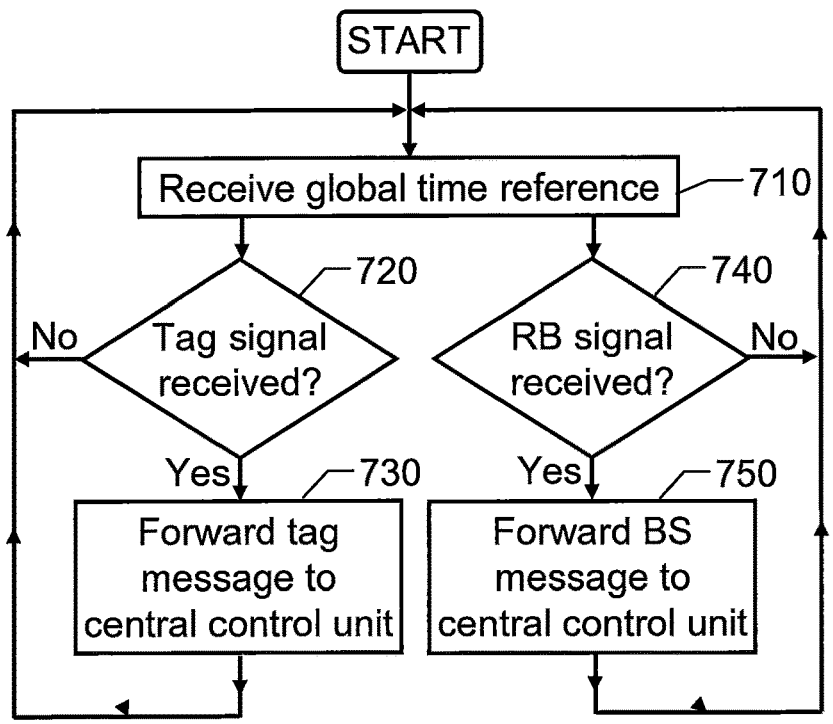
FIG. 7 illustrates, by means of a flow diagram, the general method performed in the central control unit for positioning animal tags.
Figure 8:
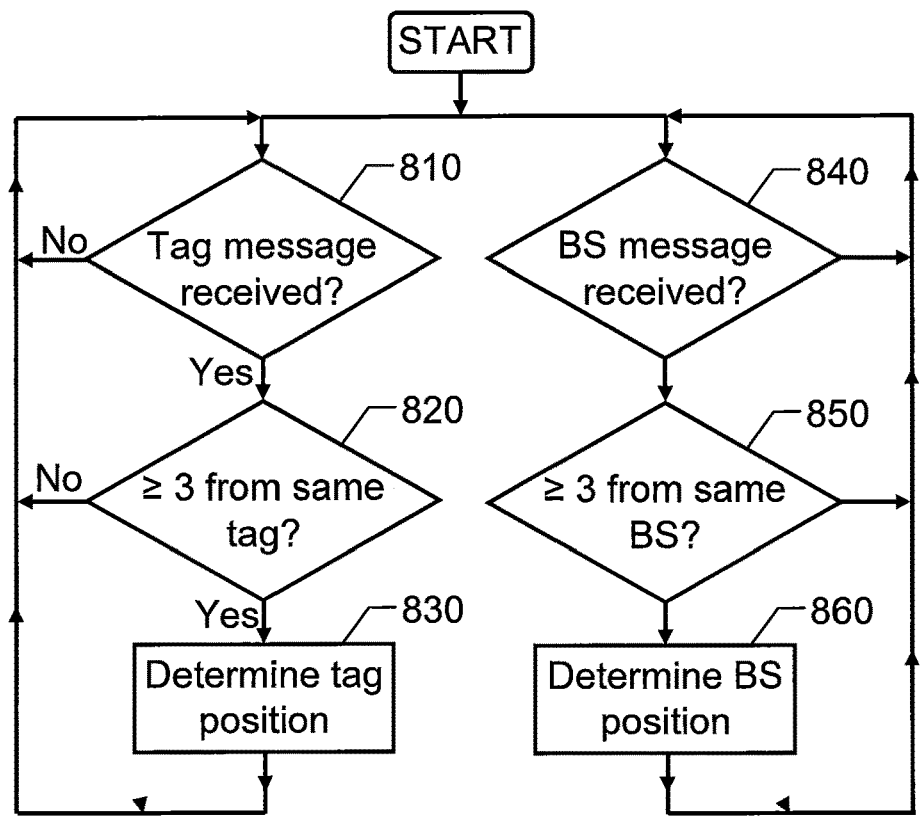
FIG. 8 illustrates, by means of a flow diagram, the general method performed in the central control unit for positioning base stations.

In order to sum up, and with reference to the flow diagrams in FIGS. 7 and 8, we will now describe the general method according to the invention for positioning animal tags and base stations performed in the base stations and the central control unit respectively.

In FIG. 7, in a first step 710, a global time reference is received. Thereafter, a step 720 checks if a tag signal has been received; if so, a step 730 follows, and otherwise the procedure loops back to step 710. In 730, a tag message is forwarded to the central control unit in response to the tag signal. Subsequently, the procedure loops back to step 710.

In another step 740 following step 710, it is checked if a radio base signal has been received; if so, a step 750 follows, and otherwise the procedure loops back to step 710. In step 750, a base station message is forwarded to the central control unit in response to the radio base signal. Subsequently, the procedure loops back to step 710.

In FIG. 8, in a first step 810, it is checked if a tag message has been received from a base station. If so, a step 820 follows; and otherwise, the procedure loops back to step 810.

In step 820, it is checked if altogether at least three tag messages have been received from the same animal tag. If so, a step 830 follows; and otherwise, the procedure loops back to step 810. In step 830, a position is determined for the animal tag from which at least three tag messages have been received. Subsequently, the procedure loops back to step 810.

In first step 840 of a procedure parallel to the above, it is checked if a base station message has been received. If so, a step 850 follows; and otherwise, the procedure loops back to step 840.

In step 850, it is checked if altogether at least three base station messages have been received from the base station. If so, a step 860 follows; and otherwise, the procedure loops back to step 840. In step 860, a position is determined for the base station from which at least three base station messages have been received. Subsequently, the procedure loops back to step 840.

All of the process steps, as well as any sub-sequence of steps, described with reference to FIGS. 7 and 8 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is primarily intended to determine the positions of milk-producing animals, e.g. cows, the proposed solution is equally well applicable for any other kind of livestock or wild animals.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for determining positions of radio tags (T), the system comprising:
    a central control unit (110); and
    a set of base stations (121, 122, 123, 124),
    each base station in said set of base stations being configured to receive a global time reference (CLK) and radio tag signals ($S_T$) transmitted from said radio tags (T),
    each of the radio tag signals ($S_T$) comprising a tag identifier uniquely identifying a respective radio tag of said radio tags (T), and
    each base station in said set of base stations being configured to forward a respective tag message describing each of any received radio tag signals ($S_T$) to the central control unit (110),
    the central control unit (110) being configured to receive the tag messages, and based thereon determine a respective position for each radio tag (T) from which a radio tag signal ($S_T$) has been received by at least three base stations in said set of base stations,
    wherein each base station in said set of base stations is further configured to:
        transmit a radio base signal comprising a base station identifier uniquely identifying the base station,
        receive radio base signals from other base stations in said set of base stations, and
        forward a base station message describing any received radio base signal to the central control unit (110),
    wherein the central control unit (110) is further configured to:
        receive at least three base station messages from respective at least three base stations in said set of base stations describing a first radio base signal from a first base station in said set of base stations, and determine a position for said first base station (121) using the received at least three base station messages, triangulation, and respective known positions of said respective base stations,
    wherein said set of base stations comprises:
        anchor base stations arranged in a frame around an area in which positions for radio tags (T) are to be determined, the anchor base stations being located in a common plane, and
        one or more intermediate base stations arranged between two of said anchor base stations, and wherein the central control unit (110) is configured to:
  calculate a first sub distance between a first anchor base station and an intermediate base station of said one or more intermediate base stations where, in a projection onto the common plane, the intermediate base station is located on a straight line between the first anchor base station and a second anchor base station,
  calculate a second sub distance between the second anchor base station and the intermediate base station,
  obtain an overall distance between said first and second anchor base stations, and
  determine that the intermediate base station is located outside the common plane if a sum of the first and second sub distances is larger than the overall distance.

2. A method of determining positions of radio tags (T) via a set of base stations (121, 122, 123, 124) and a central control unit (110), the method comprising:
  receiving, in each base station in the set of base stations, a global time reference (CLK);
  receiving, in at least three base stations in said set of base stations, a radio tag signal ($S_T$) transmitted from a radio tag (T), the radio tag signal ($S_T$) comprising an identifier uniquely identifying the radio tag (T);
  forwarding, from each of the at least three base stations, a respective tag message describing the received radio tag signal ($S_T$) to the central control unit (110);
  receiving in the central control unit (110) the respective tag messages forwarded by the at least three base stations, and based thereon determining a position of the radio tag (T);
  transmitting, from each base station in said set of base stations, a respective radio base signal comprising an identifier uniquely identifying the base station;
  checking if a radio base signal having been received from any other base station of said base stations in said set of base stations, and forwarding a base station message describing any received radio base signal received from said any other base station to the central control unit (110); and
  in response to receiving in the central control unit (110) at least three base station messages describing a first radio base signal of a first base station in said set of base stations, determining a position for the first base station (121) using the received at least three base station messages, triangulation, and respective known positions of respective base stations in said set of base stations from which the at least three base station messages were received,
wherein said set of base stations comprises:
  anchor base stations arranged in a frame around an area in which positions for the radio tags (T) are to be determined, the anchor base stations being located in a common plane, and
  one or more intermediate base stations arranged between two of said anchor base stations,
wherein the method further comprises, in the central control unit (110):
  calculating a first sub distance between a first base station and an intermediate base station where, in a projection onto the common plane, the intermediate base station is located on a straight line between the first anchor base station and a second anchor base station,
  calculating a second sub distance between the second anchor base station and the intermediate base station,
  obtaining an overall distance between said first and second anchor base stations, and
  determining that the intermediate base station is located outside the common plane if a sum of the first and second sub distances is larger than the overall distance,
  the overall distance, the first sub distance and the second sub distance being calculated based on respective radio base signals from the intermediate base station, the first anchor base station, and the second anchor base station.

* * * * *